(12) United States Patent
Oami et al.

(10) Patent No.: US 10,956,753 B2
(45) Date of Patent: Mar. 23, 2021

(54) IMAGE PROCESSING SYSTEM AND IMAGE PROCESSING METHOD

(71) Applicant: NEC CORPORATION, Tokyo (JP)

(72) Inventors: Ryoma Oami, Tokyo (JP); Yusuke Takahashi, Tokyo (JP); Hiroyoshi Miyano, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/352,311

(22) Filed: Mar. 13, 2019

(65) Prior Publication Data

US 2019/0213424 A1    Jul. 11, 2019

Related U.S. Application Data

(63) Continuation of application No. 14/916,441, filed as application No. PCT/JP2014/067706 on Jul. 2, 2014.

(30) Foreign Application Priority Data

Sep. 19, 2013   (JP) ................................ 2013-194651

(51) Int. Cl.
   *G06K 9/00*       (2006.01)
   *G08B 21/18*      (2006.01)
   (Continued)

(52) U.S. Cl.
   CPC ..... *G06K 9/00778* (2013.01); *G06K 9/00362* (2013.01); *G06K 9/00718* (2013.01);
   (Continued)

(58) Field of Classification Search
   CPC ........... G06K 9/00771; G06K 9/00221; G06K 9/00288; G06K 9/00268; G06K 9/00335;
   (Continued)

(56) References Cited

U.S. PATENT DOCUMENTS 7,266,771 B1 * 9/2007 Tow ..................... G11B 27/105
                                                    715/719
2003/0107649 A1   6/2003 Flickner et al.
   (Continued)

FOREIGN PATENT DOCUMENTS

JP    2002-279540 A    9/2002
JP    2005-512245 A    4/2005
   (Continued)

OTHER PUBLICATIONS

Tracking Groups of People in Presence of Occlusion Hamed Kiani Galoogahi 2010 Fourth Pacific-Rim Symposium on Image and Video Technology Year: 2010, pp. 438-444 (Year: 2010).*
   (Continued)

*Primary Examiner* — Kim Y Vu
*Assistant Examiner* — Michael J Vanchy, Jr.
(74) *Attorney, Agent, or Firm* — Sughrue Mion, PLLC

(57) ABSTRACT

To provide an image processing system, an image processing method, and a program, capable of detecting a group with high irregularity. An image processing system is provided with: a group detector that detects a group based on an input image captured with an image capturing at a first time; a repeating group analyzer that determines that a detected group has been previously detected; and an alert module that reports when the detected group has been determined by the repeating group analyzer to have been previously detected.

20 Claims, 7 Drawing Sheets

(51) Int. Cl.
*G06K 9/62* (2006.01)
*G06K 9/46* (2006.01)
*G08B 13/196* (2006.01)

(52) U.S. Cl.
CPC ............ *G06K 9/46* (2013.01); *G06K 9/6215* (2013.01); *G08B 21/18* (2013.01); *G08B 13/19613* (2013.01)

(58) Field of Classification Search
CPC ............ G06K 9/6218; G06K 9/00362; G06K 9/00718; G06K 9/00778; G06K 9/46; G06K 9/6215; G08B 13/19613; G08B 13/19602; G08B 13/19608; G08B 13/19691; G08B 13/19645; G08B 31/00; G08B 23/00; G08B 21/18; G06T 2207/30232
See application file for complete search history.

(56) References Cited

U.S. PATENT DOCUMENTS

| | | | | |
|---|---|---|---|---|
| 2003/0107650 | A1* | 6/2003 | Colmenarez | G08B 13/19602 348/150 |
| 2003/0215134 | A1* | 11/2003 | Krumm | G06K 9/00228 382/170 |
| 2004/0036712 | A1 | 2/2004 | Cardno | |
| 2004/0117638 | A1* | 6/2004 | Monroe | G06K 9/00221 713/186 |
| 2007/0189585 | A1 | 8/2007 | Sukegawa et al. | |
| 2012/0321145 | A1* | 12/2012 | Saito | G06F 16/5838 382/118 |
| 2013/0243252 | A1* | 9/2013 | Xu | H04N 7/002 382/103 |

FOREIGN PATENT DOCUMENTS

| | | |
|---|---|---|
| JP | 2006-011728 A | 1/2006 |
| JP | 2006-092396 A | 4/2006 |
| JP | 2007-209008 A | 8/2007 |
| JP | 4966820 B2 | 7/2012 |
| JP | 2013-045344 A | 3/2013 |
| JP | 2013228956 A | 11/2013 |
| WO | 2011/046128 A1 | 4/2011 |
| WO | 2013057904 A1 | 4/2013 |

OTHER PUBLICATIONS

Communication dated Jun. 5, 2019, issued by the U.S. Patent and Trademark Office in co-pending U.S. Appl. No. 14/916,441.
Arnold Wiliem et al., "A suspicious behaviour detection using a context space model for smart surveillance systems", Computer Vision and Image Understanding 116, 2012, pp. 194-209 (16 pages total).
Communication dated May 22, 2018, issued by the Japan Office in corresponding Japanese Application No. 2015-537585.
International Search Report of PCT/JP2014/067706 dated Aug. 12, 2014 [PCT/ISA/210].
Written Opinion of PCT/JP2014/067706 dated Aug. 12, 2014 [PCT/ISA/237].
Tracking Groups of People in Presence of Occlusion, Hamed Kiani Galoogahi, 2010 Fourth Pacific-Rim Symposium on Image and Video Technology, Year: 2010, pp. 438-443.

* cited by examiner

IMAGE PROCESSING SYSTEM AND IMAGE PROCESSING METHOD

CROSS REFERENCE TO RELATED APPLICATIONS

This application is a continuation of U.S. application Ser. No. 14/916,441, filed Mar. 3, 2016, which is a National Stage of International Application No. PCT/JP2014/067706, filed Jul. 2, 2014, claiming priority based on Japanese Patent Application No. 2013-194651, filed Sep. 19, 2013, the contents of all of which are incorporated herein by reference in their entireties.

TECHNICAL FIELD

Exemplary embodiments according to the present invention relate to an image processing system, an image processing method and program.

BACKGROUND ART

Techniques that analyze video captured with a surveillance camera or the like to detect abnormal conditions of a crowd have been contemplated in these years. For example, related techniques using a statistic cluster region in an input image may be provided.

CITATION LIST

Patent Literature

[PTL 1] Japanese Patent Publication No. 4966820
[PTL 2] PCT International Publication No. 2011-046128
[PTL 3] Japanese Laid-open Patent Publication No. 2007-209008
[PTL 4] Japanese Laid-open Patent Publication No. 2006-092396

SUMMARY OF INVENTION

Technical Problem

Techniques may detect unusual congestion in which staying crowds frequently occur. However, there are other demands such as a demand for detecting a group of persons who seem likely to commit a criminal act.

Exemplary embodiments have been made in light of the problem described above. It is an aspect to provide an image processing system, an image processing method and a program that are capable of detecting an abnormal group of persons.

Solution to Problem

An Exemplary embodiment of an image processing system includes:
a detection unit that detects a group in an input image captured with an image capturing device;
a determination unit that determines whether the detected group has been detected in the past; and
an output unit that provides an alert when it is determined by the determination unit that the detected group has been detected in the past.

An Exemplary embodiment of an image processing method performed by an image processing system, the method includes:
detecting a group in an input image captured with an image capturing device;
determining whether the detected group has been detected in the past; and
providing an alert when it is determined that the detected group has been detected in the past.

A program causing a computer to execute a set of processing, the processing includes:
a processing to detect a group in an input image captured with an image capturing device;
a processing to determine whether the detected group has been detected in the past; and
a processing to provide an alert when it is determined that the detected group has been detected in the past.

Advantageous Effects of Invention

Exemplary embodiments provide an image processing system, an image processing method and a program that are capable of detecting an abnormal group of persons.

DESCRIPTION OF EMBODIMENTS

Figure 1A:
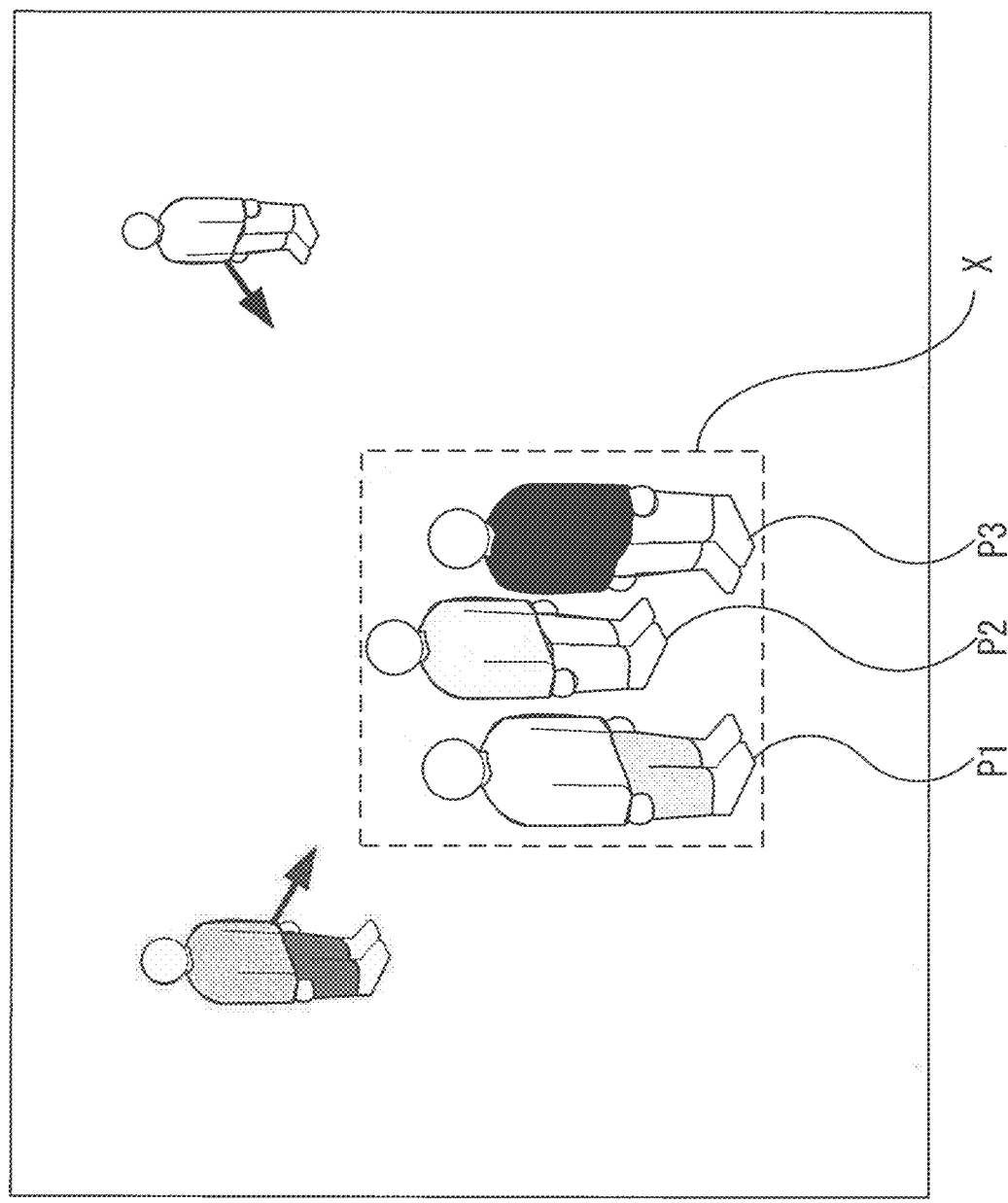
FIG. 1A is a diagram illustrating an example of an input image.

Exemplary embodiments will be described below. In the following description and the drawings, the same or similar components are given the same or similar reference numerals.

1 First Exemplary Embodiment

FIGS. 1 to 4 are diagrams for illustrating a first exemplary embodiment. The first exemplary embodiment will be described with reference to the diagrams in the following order. First, "1.1" provides an overview of a method for detecting a group having a high degree of abnormality according to this exemplary embodiment. Then, "1.2" provides an overview of a functional configuration of an image processing system according to this exemplary embodiment. "1.3" describes a flow of a process performed in the image processing system. "1.4" describes an example of a hardware configuration capable of implementing the image processing system. Lastly, "1.5" describes advantageous effects of this exemplary embodiment.

1.1 Overview

An image processing system according to this exemplary embodiment is intended to detect a group of persons that has a high degree of abnormality from video captured with one or more image capturing devices such as a surveillance camera, for example. Hereinafter, a group of persons will be also referred to as a "cluster". The cluster can also be referred to as a crowd. Each of the persons making up a cluster may stay in one place or may be moving collectively.

One method for putting analysis of video captured with a surveillance camera to use for surveillance may be to detect a region where a plurality of persons are staying and then provide an alert of the occurrence of a staying crowd, for example. However, such a method for detecting each occurrence of a staying crowd of persons also provides an alert when a plurality of persons are waiting for someone, for example. As a result, the frequency of alerts so increases that a surveillant cannot determine whether the cluster is a suspicious cluster or a normal cluster, which can lead to increase in complexity of the surveillance.

A group of thieves often repeatedly gather together at intervals. The image processing system according to this exemplary embodiment detects a cluster that gathers together a plurality of times at intervals as a group (cluster) with a high degree of abnormality and provides the alert. Further, when only scenes of clusters are searched for among video images captured in the past and the result of the search is displayed, the image processing system may determine whether the scenes are abnormal based on the number of gatherings and may then display (provide an alert of) scenes of groups in descending order of the degree of abnormality. This will be briefly described with reference to FIGS. 1A to 1C.

Figure 1B:
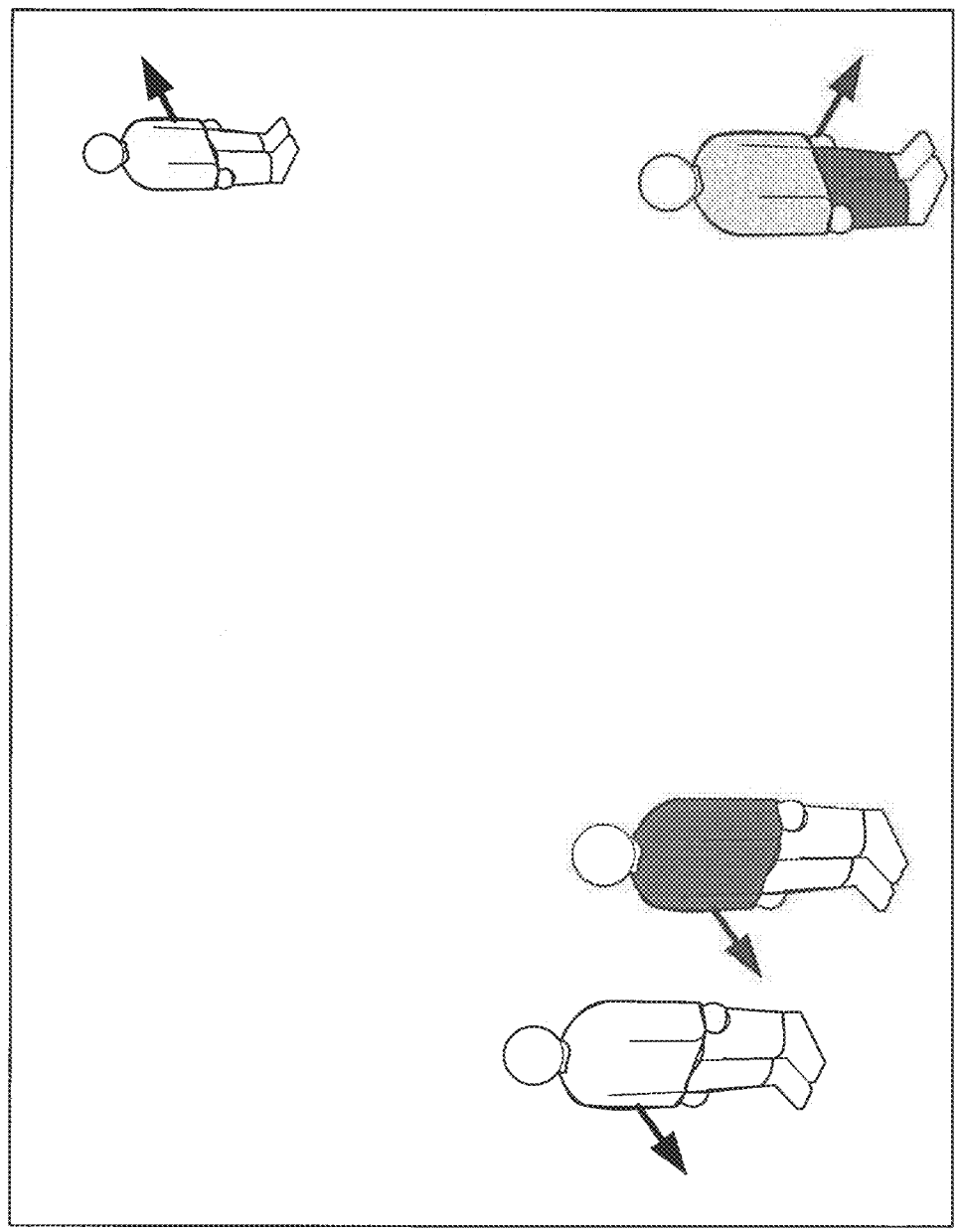
FIG. 1B is a diagram illustrating an example of an input image.
Figure 1C:
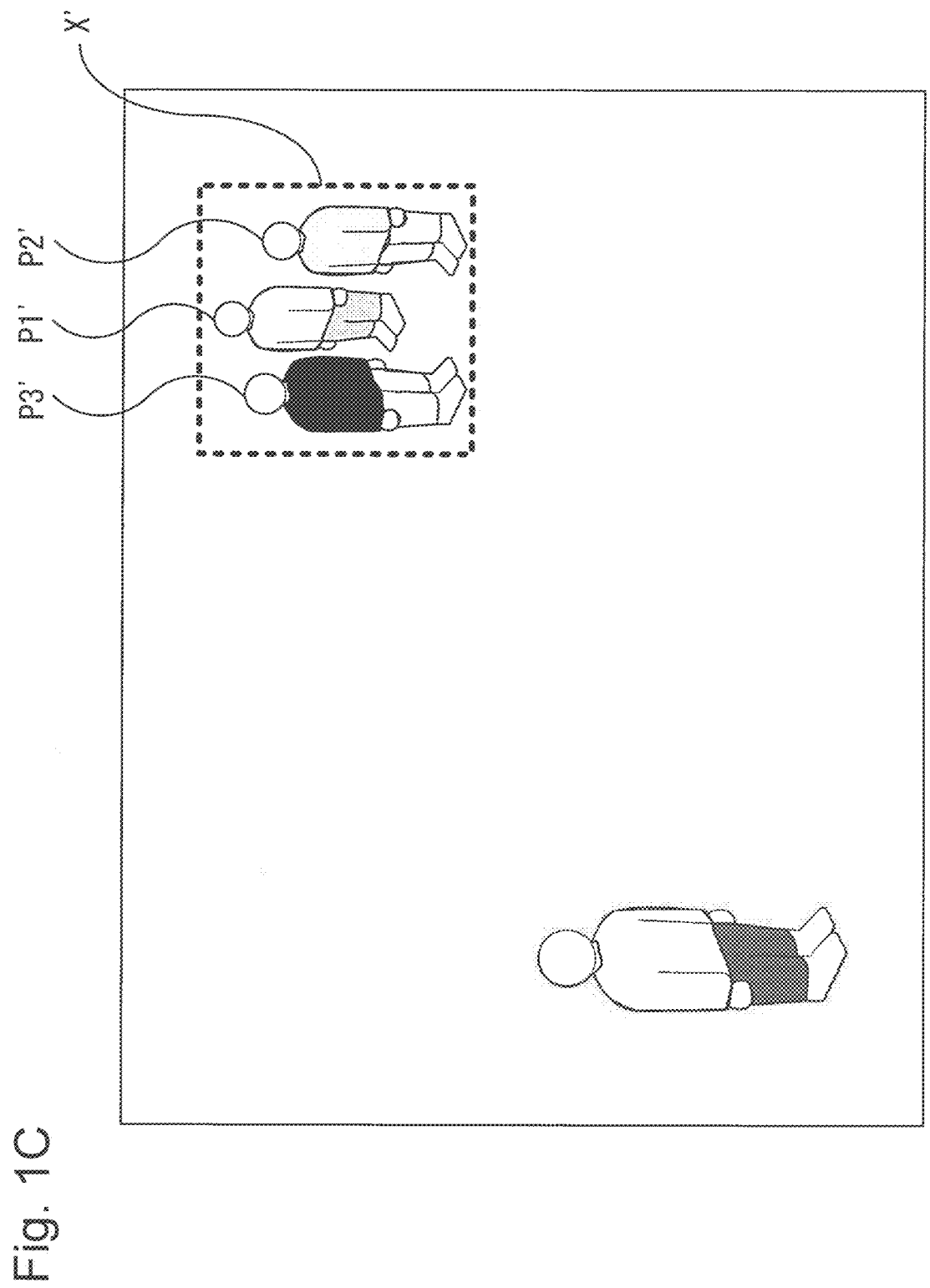
FIG. 1C is a diagram illustrating an example of an input image and an example of an alerting method.

FIGS. 1A to 1C illustrate images captured at different times (the images in FIG. 1A, FIG. 1B and FIG. 1C are captured in this chronological order). In the example in FIG. 1A, persons P1 to P3 make up a cluster X. The image processing system detects such a group.

Suppose that subsequently persons P1 to P3 making up the cluster X has dispersed (the cluster X is no longer detected by the image processing system) as illustrated in FIG. 1B, then a new cluster X' of persons P1' to P3' is detected by the image processing system as illustrated in FIG. 1C. In this case, if each of persons P1' to P3' making up the cluster X' has a feature similar to the feature in any one of persons P1 to P3 who have made up the cluster X, it can be presumed that persons P1 to P3 making up the cluster X have gathered together again as the cluster X'. When the image processing system detects the cluster in this way, the image processing system according to this exemplary embodiment determines whether a cluster that can be determined to be the same cluster has been detected in the past. If the same cluster has been detected a number of times equal to or greater than a threshold, the image processing system provides an alert to a user by presenting a display screen as illustrated in FIG. 1C, for example. The example in FIG. 1C alerts the user to an abnormal cluster by positioning a graphic element that encloses the cluster having a high degree of abnormality. This allows the user conducting surveillance using the image processing system to recognize the cluster having a high degree of abnormality and therefore the efficiency of the surveillance can be increased.

Note that there may be various methods of detecting clusters X and X'. For example, individual person regions may be detected in an input image based on the feature in the head, upper body, entire body or other parts and, if there are a plurality of persons in a certain region, this region may be determined to be a cluster. Alternatively, a feature of a cluster region in which a plurality of persons gathering together may be learned beforehand, and a region including the feature of a cluster may be determined as a cluster. In this case, a cluster is detected without separating the cluster into individual the cluster into individual persons.

Further, there may be a number of methods for determining whether clusters X and X' are the same. For example, to detect individual persons making up each of the clusters X and X', personal features (identified as features in images of persons, for example) are extracted first based on shapes and colors of clothes or faces, or the like in the images of the detected persons. Then determination is made based on the similarity to the personal feature as to whether the degree of similarity exceeds a threshold, for example, to determine whether the individual persons are the same. As a result, if it can be determined that persons making up the cluster X are identical or similar to persons making up the cluster X' (a case where one person making up the cluster is absent/added/replaced can also be included, for example), the image processing system can determine that the cluster X is identical or highly similar to the cluster X'.

Note that the personal features are not limited to clothes or faces noted above. For example, the personal features may include, but not limited to, "hairstyle", "posture", "gait" and the like.

Alternatively, a feature of a cluster image (image of the cluster region) in each of the clusters X and X' as a whole may be calculated and then the degree of similarity between the clusters X and X' may be calculated based on the feature. Note that the feature of cluster image may be represented by, but not limited to, a histogram of colors in the cluster region, for example.

1.2 System Overview

Figure 2:
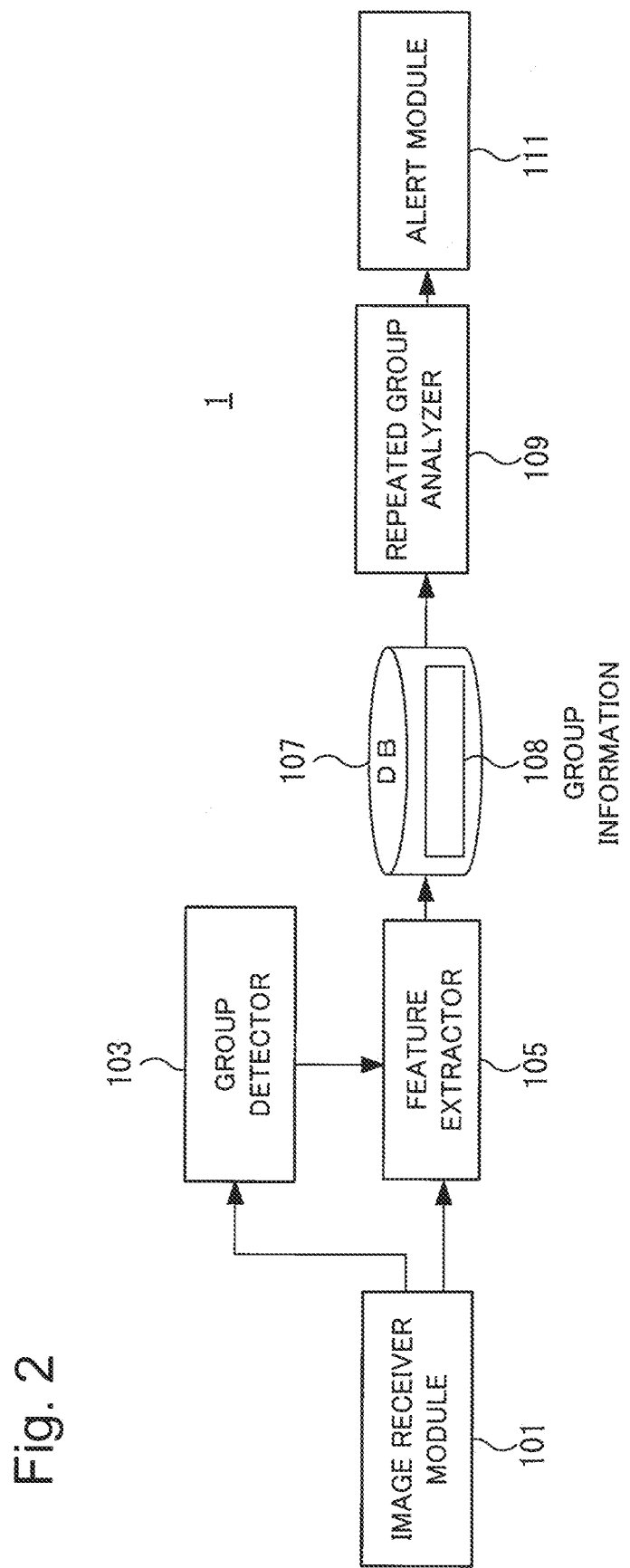
FIG. 2 is a functional block diagram illustrating a general configuration of an image processing system according to a first exemplary embodiment.

A system configuration of the image processing system 1 according to this exemplary embodiment will be described below with reference to FIG. 2. FIG. 2 is a block diagram illustrating a system configuration of the image processing system 1.

The image processing system 1 includes an image receiver module 101, a group detector 103, a feature extractor 105, a database 107, a repeated group analyzer 109 and an alert module 111.

The image receiver module 101 receives sequentially frame images included in video from one or more image capturing devices such as a surveillance camera (not depicted). Alternatively, the image receiver module 101 may receive frame images that can be obtained by decoding video data stored in an HDD (Hard Disk Drive) or a VCR (Video Cassette Recorder), not depicted.

The group detector 103 detects a gathering of persons (a cluster) from each of image frames (input images) input from the image receiver module 101. As noted above, a cluster may stay (be static) in one location for a certain period of time or may be moving. Although various sizes of clusters may be detected, it is rare that a large group consisting of more than ten persons commit a crime or the like. Accordingly, the cluster of about four or five persons, for example, may be monitored for by the group detector 103.

There may be various methods that can be used by the group detector 103 for detecting a cluster. For example, a detector that can detect images of persons, heads, upper bodies and the like based on data obtained by machine learning may be used to detect persons in input images and a region where a plurality of persons are detected in a certain range may be identified as a cluster. Alternatively, a cluster detector that can detect a feature of group of persons based on data obtained by machine learning may be used to detect a cluster. In another method, analysis of motions may be conducted in conjunction with analysis of image frames in a certain period of time in the past and, when it can be determined that there are a plurality of persons in a region that is moving in the same direction (or is staying), the region may be identified as a cluster.

The feature extractor 105 calculates the feature of each cluster or each of the persons making up each cluster detected by the group detector 103. Examples of feature include a histogram information of colors of the person image region for example. When a degree of sameness of clusters is determined by using degrees of sameness of persons making up the clusters by the repeated group analyzer 109, which will be described later, the feature extractor 105 calculates a feature of each of the persons making up each cluster. When a degree of sameness of clusters is determined by using a feature of an entire cluster by the repeated group analyzer 109, the feature extractor 105 extracts a feature of the cluster region. The feature extractor 105 outputs the calculated feature of the entire cluster and/or the feature of the individual persons making up the cluster together with position information of the cluster to the database (DB) 107 as group information 108.

Note that the feature extracted is not limited to the color information. If a facial feature can be extracted, the facial feature may be extracted. If a feature of pattern of clothes or belongings (bag, hat or the like) can be extracted, the pattern feature may be extracted. Alternatively, gait is characteristic, matching may be performed between continuous frames and a feature of motion may be extracted.

The repeated group analyzer 109 determines, among pieces of the group information 108 stored in the database 107, a degree of similarity of features between clusters or a degree of similarity of features between persons making up a cluster and persons making up another cluster to check if the clusters that have the same feature have been detected in the past. By performing the process, the repeated group analyzer 109 counts clusters that have similar features (i.e. the number of gatherings of the clusters/the number of times the clusters has been detected) and determines a cluster whose number of times is large (for example a cluster that has been detected a number of times equal to or greater than a threshold) to be the cluster that has a high degree of abnormality.

At the same time, the repeated group analyzer 109 may also determine whether a cluster has been staying for a period of time longer than a predetermined time period and may increase the score of abnormality in accordance with the period of time of stay or the number of stays. If the repeated group analyzer 109 determines abnormality based on a threshold related to the number of times a cluster has been detected, a user of the image processing system 1 may externally input a particular threshold.

When the repeated group analyzer 109 determines abnormality, the repeated group analyzer 109 may take into consideration time intervals at which a cluster that can be determined to have a high degree of sameness is formed. A cluster that is frequently detected at short time intervals such as at intervals of several minutes in nearly the same location by the same image capturing device, or a cluster that is detected at multiple times in a plurality of locations among which a cluster can move at substantially the same speed is likely to have been staying in the location or moving together. The repeated group analyzer 109 may exclude such clusters that were detected at time intervals shorter than a first threshold interval that is relatively short (clusters that can be determined to be the same, clusters that can be determined to be undispersed after detection) from clusters for which the number of cluster gatherings is to be counted.

On the other hand, for a cluster detected at time intervals longer than the first threshold interval (a cluster detected again after the cluster was found to be dispersed), the repeated group analyzer 109 may count the times of gatherings of the cluster if the time interval is within a second threshold interval that is longer than the first threshold interval. This enables extraction of groups that gather frequently in a relatively short period of time.

Further, when a cluster that has a high degree of sameness is frequently detected in video captured with different image capturing devices or is detected in different locations in video captured with the same image capturing device, the cluster may be given a weight indicating a high degree of abnormality and counted (scoring relating to the degree of abnormality).

The repeated group analyzer 109 may exclude groups that can be determined to have low degrees of abnormality, such as a group of persons wearing a security guard uniform or a group of persons standing in line in front of a shop, from clusters for which determination of the degree of abnormality is to be made. Note that a line formed in front of a shop may be identified based on the orientation or location of persons making up the cluster.

Alternatively, the repeated group analyzer 109 may assign weights to gatherings of clusters by taking time of day into consideration and count. In this case, when a cluster is detected in a time of day when people do not gather usually, such as in the midnight, the repeated group analyzer 109 may determine that the cluster has a high degree of abnormality and may assign a high weight to the cluster and count. Further, the repeated group analyzer 109 may assign a higher weight to clusters that are detected in the same location and are similar to each other than weights of clusters detected in different locations and may count.

If the feature extractor 105 has extracted a plurality of feature of hairstyles, postures, belongings or the like, the repeated group analyzer 109 may determine a degree of abnormality in accordance with the extracted features and assign weights and count. For example, when the feature extractor 105 detects a knife as a belonging, the repeated group analyzer 109 may count one detection of the group to which the person carrying the knife belongs as three detections of a normal group.

When the repeated group analyzer 109 detects a cluster with a high degree of abnormality, the alert module 111 alerts a user that a cluster that with a high degree of abnormality has been detected by graphically displaying the cluster with a mark or by producing sound or the like. Alternatively, the alert module 111 may output information concerning the detected cluster to a storage medium or other information processing device, not depicted, or the like.

The alert module 111 may display the captured image of the cluster detected by the repeated group analyzer 109. In this case, the alert module 111 may display a plurality of images of the cluster that were captured at different image capturing (detection) times. The alert module 111 may display a plurality of images near the detected cluster. Further, the image displayed by the alert module 111 may be an image concerning the cluster counted a number of times equal to or greater than a threshold, for example.

The alert module 111 can search image frames (which together make up video) input from the image receiver module 101 for only scenes in which a cluster with a high degree of abnormality has been detected and may display the scenes on a display device, not depicted. In this case, the alert module 111 may first determine the abnormality based on a degree of abnormality (for example the number of clusters detected) and may display the scenes including clusters having high degrees of abnormality in descending order of the degree of abnormality.

1.3 Process Flow

Figure 3:
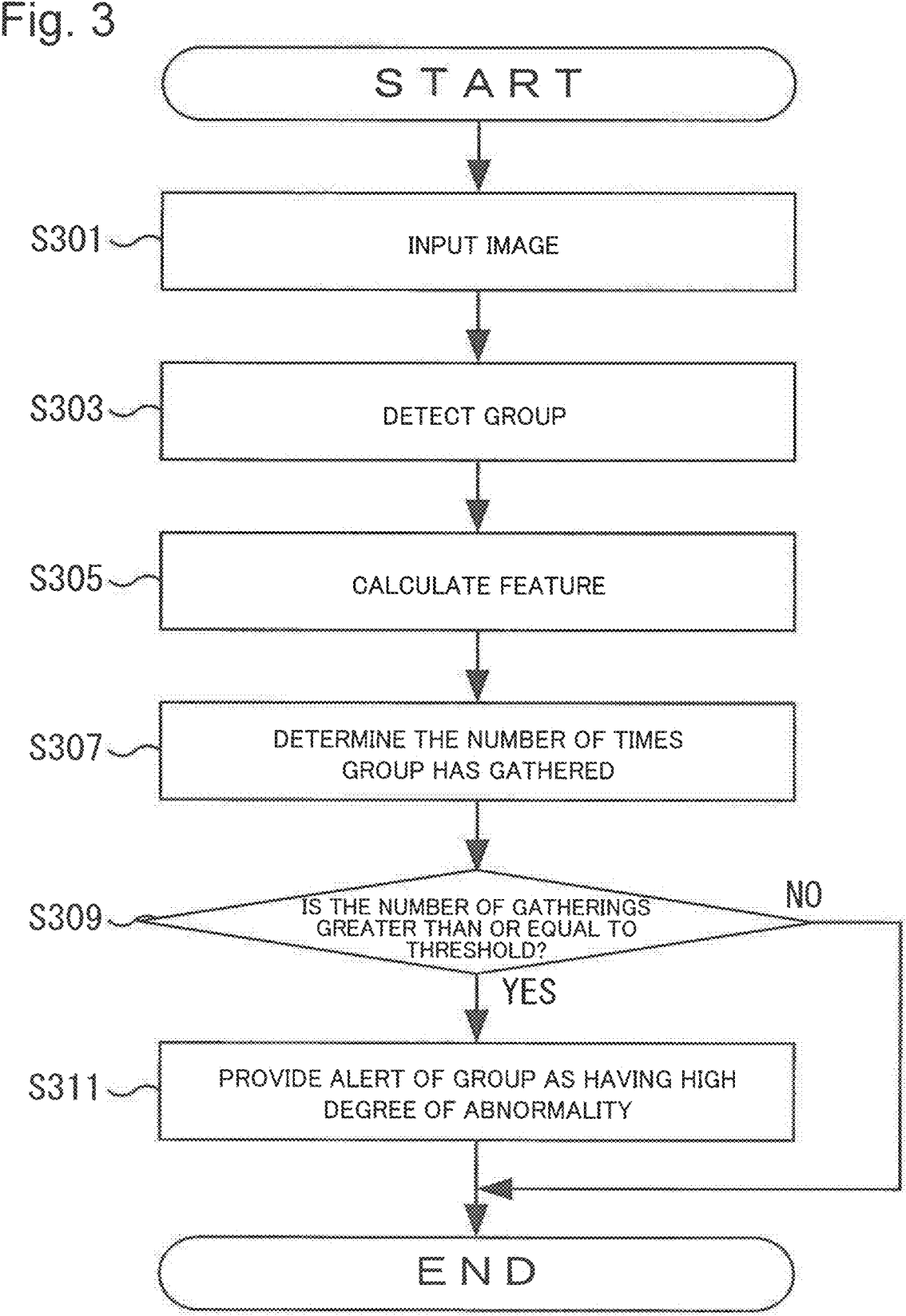
FIG. 3 is a flowchart illustrating a flow of a process performed in the image processing system illustrated in FIG. 2.

A flow of a process performed in the image processing system 1 will be described below with reference to FIG. 3. FIG. 3 is a flowchart illustrating a flow of a process performed in the image processing system 1 according to this exemplary embodiment.

Note that process steps described below can be executed in any different order or some of the process steps can be executed in parallel, or another step may be added between process steps as long as no contradiction results from the reordering or parallel execution or addition of the step. Further, a step described as a single step for convenience can be divided into steps and executed or steps described as separate steps for convenience can be executed as a single step.

When an image (an image frame of video) is input from the image 101 (S301), the group detector 103 detects whether a cluster appears in the image (S303). There may be various methods for detecting a cluster. For example, persons in the input image may be detected first and then determination is made as to whether the detected persons are within a predetermined range. Alternatively, a detector may be used to determine whether there is an image region that has a feature of a cluster in an image frame. Alternatively, the group detector 103 may analyze image frames input in a certain period of time and, if a plurality of persons are moving in substantially the same direction or stay for a certain duration, the group detector 103 may identify the plurality of persons as the cluster.

The feature extractor 105 calculates a feature of the entire cluster identified by the group detector 103 and/or a feature of individual persons making up the cluster identified by the group detector 103 (S305). The feature extractor 105 stores the calculated feature of the cluster (including the features of the persons making up the cluster) in the DB 107 together with position information of the cluster, detection time information and the like as the group information 108.

The repeated group analyzer 109 checks each of clusters for which the group information 108 is stored in the DB 107 about whether the cluster can be determined to be the same as one of the clusters. Note that targets of the determination for the degree of sameness of clusters may be not only clusters detected in images captured with a same image capturing device but also clusters detected in images captured with different image capturing devices.

If features of individual persons making up a cluster have been calculated, the repeated group analyzer 109 first determines whether the individual persons making up the cluster is the same persons in a cluster by calculating a degree of similarity, for example, between the individual persons making up the cluster (for example, whether the degree of similarity exceeds a threshold). As a result, if there is a cluster that is made up by the same persons as those in another cluster, the repeated group analyzer 109 can identify the cluster as the same cluster. At this time, even if one of the persons making up the cluster is absent or one person has been added to the cluster or one person has replaced one of the persons making up the cluster, the repeated group analyzer 109 may determine that the cluster is the same cluster.

Alternatively, if the feature of the entire cluster has been calculated, the repeated group analyzer 109 may calculate a degree of similarity between features of clusters and, if the degree of similarity exceeds a threshold, the repeated group analyzer 109 can determine the clusters are the same.

In this way, the repeated group analyzer 109 first determines the number of the times each cluster has been formed (the number of times each cluster has been detected) and, if the number of times the cluster has been formed is equal to or greater than a threshold (Yes at S309), the repeated group analyzer 109 can determine that the cluster is a group with a high degree of abnormality. In that case, the alert module 111 alerts a user, who is a surveillant, for example, to the cluster having a high degree of abnormality (S311).

1.4 Hardware Configuration

An exemplary hardware configuration of the image processing system 1 described above that is implemented by a computer will be described with reference to FIG. 4. Note that the functions of the image processing system 1 can also be implemented by a plurality of information processing devices.

Figure 4:
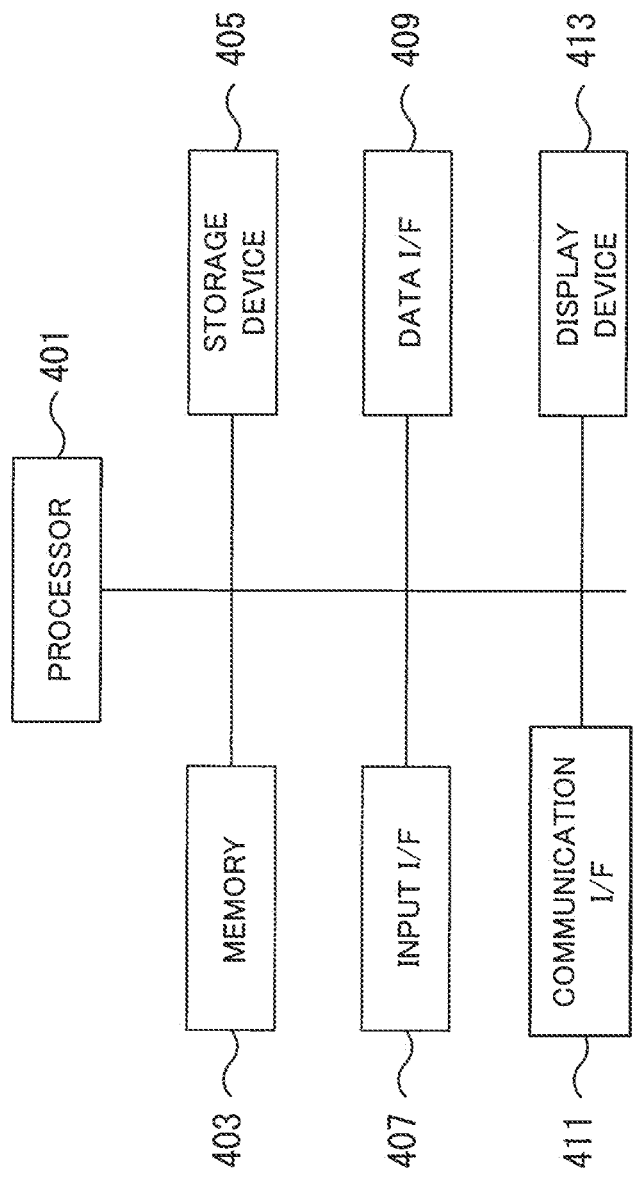
FIG. 4 is a block diagram illustrating a configuration of hardware capable of implementing the image processing system illustrated in FIG. 2.

As illustrated in FIG. 4, the image processing system 1 includes a processor 401, a memory 403, a storage device 405, an input interface (I/F) 407, a data I/F 409, a communication I/F 411 and a display device 413.

The processor 401 executes a program stored in the memory 403 to control various processes performed in the image processing system 1. For example, processes relating to the image receiver module 101, the group detector 103, the feature extractor 105, the repeated group analyzer 109 and the alert module 111 illustrated in FIG. 2 can be implemented as a program which is temporality stored on the memory 403 and then runs on the processor 401.

The memory 403 is a storage medium such as a RAM (Random Access Memory) or the like. The memory 403 temporarily stores program codes of a program executed by the processor 401 or data required during execution of the program. For example a stack area required for executing the program is provided in a storage area in the memory 403.

The storage device 405 is a nonvolatile storage medium such as a hard disk or a flash memory, for example. The storage device 405 stores an operating system, various programs for implementing the image receiver module 101, the group detector 103, the feature extractor 105, the repeated group analyzer 109 and the alert module 111, and various kinds of data, including the DB 107. The programs and data stored in the storage device 405 is loaded into the memory 403 as necessary and are referred to by the processor 401.

The input I/F 407 is a device for receiving inputs from a user. Examples of the input I/F 407 include a keyboard, a mouse, a touch panel and the like. The input I/F 407 may be connected to the image processing system 1 through an interface such as a USB (Universal Serial Bus), for example.

The data I/F 409 is a device for inputting data from outside the image processing system 1. Examples of the data I/F 409 include drive devices for reading data stored in various kinds of storage media. The data I/F 409 may be provided outside the image processing system 1. In that case, the data I/F 409 is connected to the image processing system 1 through an interface such as a USB, for example.

The communication I/F 411 is a device for providing wired or wireless data communications between the image processing system 1 and devices external to the image processing system 1, such as an image capturing device (video camera/surveillance camera) or the like. The communication I/F 411 may be provided outside the image processing system 1. In that case, the communication I/F 411 is connected to the image processing system 1 through an interface such as a USB, for example.

The display device 413 is a device for displaying video images as depicted in FIGS. 1A to 1C, for example, captured with an image capturing device, not depicted. When a cluster that a high degree of abnormality appears in a video image displayed by the display device 413, a graphical element that specifies the cluster may be superimposed on the video image. Examples of the display device 413 include a liquid-crystal display and an organic EL (Electro-Luminescence) display, for example. The display device 413 may be provided outside the image processing system 1. In that case, the display device 413 is connected to the image processing system 1 through a display cable, or the like, for example.

1.5 Advantageous Effects of Exemplary Embodiment

As described above, when a cluster that has a high degree of sameness has been detected more than one time, the image processing system 1 according to this exemplary embodiment determines that the cluster has a high degree of abnormality. This can significantly reduce the number of clusters that need to be checked as compared with mere detection of clusters. In other words, since the image processing system 1 reduces the number of alerts about groups that have low degrees of abnormality (the number of alerts that seem false alarms to a surveillant), the surveillance can be performed efficiently.

2 Second Exemplary Embodiment

Figure 5:
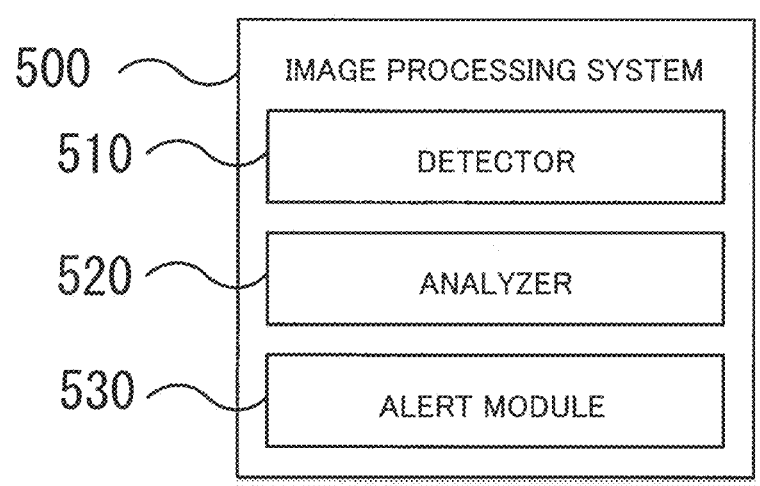
FIG. 5 is functional block diagram illustrating a general configuration of an image processing system according to a second exemplary embodiment.

A second exemplary embodiment will be described with reference to FIG. 5. FIG. 5 is a block diagram illustrating a functional configuration of an image processing system 500. As illustrated in FIG. 5, the image processing system 500 includes a detector 510, a analyzer 520 and an alert module 530.

The detector 510 detects groups in input images captured with an image capturing device, not depicted.

The analyzer 520 determines whether a group detected by the detector 510 has been detected in the past.

When it is determined by the analyzer 520 that a detected group has been detected in the past, the alert module 530 provides an alert.

The image processing system 500 thus implemented according to this exemplary embodiment is capable of detecting a group that has a high degree of abnormality.

3 Notes

Some of the components of the exemplary embodiments described above may be combined or replaced. Further, the configuration of the present invention is not limited to the exemplary embodiments described above. Various modifications can be made without departing from the spirit of the present invention.

Note that part or all of the exemplary embodiments described above can also be described, but not limited to, as in the following Supplementary Notes. A program according to the present invention may be a program that causes a computer to execute the operations described in the exemplary embodiments described above.

Supplementary Note 1

An image processing system includes:
a detection unit that detects a group in an input image captured with an image capturing device;
a determination unit that determines whether the detected group has been detected in the past; and
an output unit that provides an alert when it is determined by the determination unit that the detected group has been detected in the past.

Supplementary Note 2

The image processing system according to the supplementary note 1,
wherein the determination unit determines that the detected group has been detected in the past when a group that has a high degree of similarity to the detected group has been detected in the past.

Supplementary Note 3

The image processing system according to the supplementary note 2, further includes:
a calculation unit that calculates a feature in the detected group; and
a storage unit that stores the calculated feature,
wherein the determination unit determines the degree of similarity based on the feature.

Supplementary Note 4

The image processing system according to any one of the supplementary notes 1 to 3,
wherein the determination unit determines whether the detected group has been detected a number of times equal to or greater than a threshold,
the output unit provides the alert when it is determined by the determination unit that the detected group has been detected the number of times equal to or greater than the threshold.

Supplementary Note 5

The image processing system according to any one of the supplementary notes 1 to 4,
wherein the determination unit determines whether the detected group has been discretely detected at a time interval equal to or longer than a first threshold interval, and
the output unit provides the alert when it is determined by the determination unit that the detected group has been discretely detected at a time interval equal to or longer than the first threshold interval.

Supplementary Note 6

The image processing system according to the supplementary note 5,
wherein the determination unit determines whether the detected group has been discretely detected at a time interval equal to or longer than the first threshold interval and the time interval is equal to or shorter than a second threshold interval, and the output unit provides the alert when it is determined by the determination unit that the detected group has been discretely detected at a time interval equal to or longer than the first threshold interval and the time interval is equal to or shorter than the second threshold interval.

Supplementary Note 7

The image processing system according to the supplementary note 3, wherein the feature is calculated for each of persons making up the group.

Supplementary Note 8

The image processing system according to the supplementary note 3, wherein the feature is calculated for the entire group.

Supplementary Note 9

An image processing method performed by an image processing system, the method includes:
 detecting a group in an input image captured with an image capturing device;
 determining whether the detected group has been detected in the past; and
 providing an alert when it is determined that the detected group has been detected in the past.

Supplementary Note 10

The image processing method according to the supplementary note 9,
 wherein determining that the detected group has been detected in the past when a group that has a high degree of similarity to the detected group has been detected in the past.

Supplementary Note 11

The image processing method according to the supplementary note 10, further includes:
 calculating a feature in the detected group; and
 storing the calculated feature,
 wherein determining the degree of similarity based on the feature.

Supplementary Note 12

The image processing method according to any one of the supplementary notes 9 to 11,
 wherein determining whether the detected group has been detected a number of times equal to or greater than a threshold,
 providing the alert when it is determined that the detected group has been detected the number of times equal to or greater than the threshold.

Supplementary Note 13

The image processing method according to any one of the supplementary notes 9 to 12,
 wherein determining whether the detected group has been discretely detected at a time interval equal to or longer than a first threshold interval, and
 providing the alert when it is determined that the detected group has been discretely detected at a time interval equal to or longer than the first threshold interval.

Supplementary Note 14

The image processing method according to the supplementary note 13,
 wherein determining whether the detected group has been discretely detected at a time interval equal to or longer than the first threshold interval and the time interval is equal to or shorter than a second threshold interval, and
 providing the alert when it is determined that the detected group has been discretely detected at a time interval equal to or longer than the first threshold interval and the time interval is equal to or shorter than the second threshold interval.

Supplementary Note 15

The image processing method according to the supplementary note 11, wherein the feature is calculated for each of persons making up the group.

Supplementary Note 16

The image processing method according to the supplementary note 11, wherein the feature is calculated for the entire group.

Supplementary Note 17

A program causing a computer to execute a set of processing, the processing includes:
 a processing to detect a group in an input image captured with an image capturing device;
 a processing to determine whether the detected group has been detected in the past; and
 a processing to provide an alert when it is determined that the detected group has been detected in the past.

Supplementary Note 18

The program according to the supplementary note 17,
 wherein the determination processing is to determine that the detected group has been detected in the past when a group that has a high degree of similarity to the detected group has been detected in the past.

Supplementary Note 19

The program according to the supplementary note 18, further includes:
 a processing to calculate a feature in the detected group and a processing to store the calculated feature,
 wherein the determination processing is to determine the degree of similarity based on the feature.

Supplementary Note 20

The program according to any one of the supplementary notes 17 to 19,
 wherein the determination processing is to determine whether the detected group has been detected a number of times equal to or greater than a threshold,
 the output processing is to provide the alert when it is determined by the determination unit that the detected group has been detected the number of times equal to or greater than the threshold.

Supplementary Note 21

The program according to any one of the supplementary notes 17 to 20, wherein the determination processing is to determine whether the detected group has been discretely detected at a time interval equal to or longer than a first threshold interval, and the output processing is to provide the alert when it is determined by the determination unit that the detected group has been discretely detected at a time interval equal to or longer than the first threshold interval.

Supplementary Note 22

The program according to the supplementary note 21, wherein the determination processing is to determine whether the detected group has been discretely detected at a time interval equal to or longer than the first threshold interval and the time interval is equal to or shorter than a second threshold interval, and the output processing is to provide the alert when it is determined by the determination unit that the detected group has been discretely detected at a time interval equal to or longer than the first threshold interval and the time interval is equal to or shorter than the second threshold interval.

Supplementary Note 23

The program according to the supplementary note 19, wherein the feature is calculated for each of persons making up the group.

Supplementary Note 24

The program according to the supplementary note 19, wherein the feature is calculated for the entire group.

REFERENCE SIGNS LIST

1 . . . Image processing system, 101 . . . Image receiver module, 103 . . . Group detector, 105 . . . Feature extractor, 107 . . . Database, 108 . . . Group information, 109 . . . Repeated group analyzer, 111 . . . Alert module, 401 . . . Processor, 403 . . . Memory, 405 . . . Storage device, 407 . . . Input interface, 409 . . . Data interface, 411 . . . Communication interface, 413 . . . Display device, 500 . . . Image processing system, 510 . . . Detector, 520 . . . Analyzer, 530 . . . Alert module

The invention claimed is:

1. An image processing system comprising:
at least one processor configured to:
detect, as a group, a gathering of persons from a captured image by using a detector, the detector being generated by machine learning a feature of a region where the plurality of persons gather;
extract a feature of the detected group from the captured image, and output, to a database, group information including the extracted feature of the detected group;
generate a plurality of degree of similarity among the detected group and previously detected groups using a plurality of pieces of the group information stored in the database;
determine whether the detected group has both dispersed and gathered a number of times greater than or equal to a first threshold based on whether each of the plurality of degrees of similarity is greater than a second threshold; and provide an alert when it is determined that the number of times the detected group has dispersed and gathered is greater than or equal to the first threshold, wherein the first threshold is greater than one.

2. The image processing system according to claim 1, wherein the at least one processor is further configured to add a predetermined value of two or more to the detected number of times when the detected group is detected in the night.

3. The image processing system according to claim 1, wherein the at least one processor is further configured to add a predetermined value of two or more to the detected number of times when a location where the detected group is detected is different from a location where the detected group has been detected previously.

4. The image processing system according to claim 1, wherein the at least one processor is further configured to, when determining the detected group has been detected previously, cause a display device to arrange and display a plurality of images of the previously detected groups on the captured image.

5. The image processing system according to claim 4, wherein the plurality of images of the previously detected groups are displayed near an image of the detected group in the captured image.

6. The image processing system according to claim 1, wherein the at least one processor is further configured to:
generate a histogram corresponding to the detected group;
generate, based on the histogram corresponding to the detected group and a histogram corresponding to the previously detected group, at least one of the plurality of degrees similarity between the detected group and the previously detected group;
determine, based on the plurality of degrees of similarity, whether the detected group has been detected at a second time that is earlier than a first time when the captured image is captured;
determine whether the detected group dispersed between the first time and the second time; and
provide the alert when determining that the detected group has been detected at the second time and the detected group dispersed between the second time and the first time and a detected number of times that the detected group has been detected is equal to or greater than a threshold.

7. The image processing system according to claim 1, wherein the at least one processor is further configured to determine whether the detected group dispersed and gathered between a first time and a second time based on a time interval between the first time and the second time being greater than a third threshold.

8. The image processing system according to claim 1, wherein the at least one processor is further configured to generate a histogram corresponding to the detected group, and generate at least one of the plurality of degrees of similarity based on the histogram corresponding to the detected group and a histogram corresponding to the previously detected group.

9. The image processing system according to claim 8, wherein the first threshold is greater than two.

10. The image processing system according to claim 1, wherein the first threshold is greater than two.

11. An image processing method comprising:
by at least one computer,
detecting, as a group, a gathering of persons from a captured image by using a detector, the detector being generated by machine learning a feature of a region where the plurality of persons gather;

extracting a feature of the detected group from the captured image, and outputting, to a database, group information including the extracted feature of the detected group;

generating a plurality of degrees of similarity among the detected group and previously detected groups using a plurality of pieces of the group information stored in the database;

determining whether the detected group has both dispersed and gathered a number of times greater than or equal to a first threshold based on whether each of the plurality of degrees of similarity is greater than a second threshold; and providing an alert when it is determined that the number of times the detected group has dispersed and gathered is greater than or equal to the first threshold, wherein the first threshold is greater than one.

12. The image processing method according to claim 11, further comprising:

by the at least one computer, determining whether the detected group dispersed and gathered between a first time and a second time based on a time interval between the first time and the second time being greater than a third threshold.

13. The image processing method according to claim 11, further comprising:

by the at least one computer, generating a histogram corresponding to the detected group, and generating at least one of the plurality of degrees of similarity based on the histogram corresponding to the detected group and a histogram corresponding to the previously detected group.

14. The image processing method according to claim 13, wherein the first threshold is greater than two.

15. The image processing method according to claim 11, wherein the first threshold is greater than two.

16. A non-transitory program storage medium storing a computer program that causes a computer to execute:

detecting, as a group, a gathering of persons from a captured image by using a detector, the detector being generated by machine learning a feature of a region where the plurality of persons gather;

extracting a feature of the detected group from the captured image, and outputting, to a database, group information including the extracted feature of the detected group;

generating a plurality of degrees of similarity among the detected group and previously detected groups using a plurality of pieces of the group information stored in the database;

determining whether the detected group has both dispersed and gathered a number of times greater than or equal to a first threshold based on whether each of the plurality of degrees of similarity is greater than a second threshold; and providing an alert when it is determined that the number of times the detected group has dispersed and gathered is greater than or equal to the first threshold, wherein the first threshold is greater than one.

17. The non-transitory program storage medium according to claim 16, wherein the computer program causes further a computer to execute, determining whether the detected group dispersed and gathered between a first time and a second time based on a time interval between the first time and the second time being greater than a third threshold.

18. The non-transitory program storage medium according to claim 16, wherein the computer program causes further a computer to execute, generating a histogram corresponding to the detected group, and generating at least one of the plurality of degrees of similarity based on the histogram corresponding to the detected group and a histogram corresponding to the previously detected group.

19. The non-transitory program storage medium according to claim 18, wherein the first threshold is greater than two.

20. The non-transitory program storage medium according to claim 16, wherein the first threshold is greater than two.

* * * * *